US012571485B2

(12) United States Patent
Kanai

(10) Patent No.: US 12,571,485 B2
(45) Date of Patent: Mar. 10, 2026

(54) FLOW-RATE CONTROL VALVE ACTUATOR

(71) Applicant: KOGANEI CORPORATION,
Koganei (JP)

(72) Inventor: Ryoji Kanai, Tokyo (JP)

(73) Assignee: KOGANEI CORPORATION, Tokyo
(JP)

( * ) Notice: Subject to any disclaimer, the term of this
patent is extended or adjusted under 35
U.S.C. 154(b) by 0 days.

(21) Appl. No.: 18/851,864

(22) PCT Filed: Mar. 20, 2023

(86) PCT No.: PCT/JP2023/011012
§ 371 (c)(1),
(2) Date: Sep. 27, 2024

(87) PCT Pub. No.: WO2023/189860
PCT Pub. Date: Oct. 5, 2023

(65) Prior Publication Data
US 2025/0215998 A1 Jul. 3, 2025

(30) Foreign Application Priority Data

Mar. 30, 2022 (JP) ................................. 2022-056391
Feb. 22, 2023 (JP) ................................. 2023-026189

(51) Int. Cl.
*F16K 31/50* (2006.01)
*F16K 1/04* (2006.01)
(52) U.S. Cl.
CPC ................ *F16K 31/50* (2013.01); *F16K 1/04*
(2013.01)
(58) Field of Classification Search
CPC .................................... F16K 31/50; F16K 1/04
See application file for complete search history.

(56) References Cited

U.S. PATENT DOCUMENTS 3,311,121 A * 3/1967 Morrell ................... F16K 31/04
137/15.19
3,409,271 A * 11/1968 Kallenbach ........... F16K 31/508
251/266
(Continued)

FOREIGN PATENT DOCUMENTS

JP 2010014128 A 1/2010
JP 2021032346 A 3/2021
WO 2006131961 A1 12/2006

OTHER PUBLICATIONS

International Search Report mailed on Jun. 13, 2023, in connection
with corresponding International Application No. PCT/JP2023/
011012 (4 pp.).

*Primary Examiner* — Umashankar Venkatesan
(74) *Attorney, Agent, or Firm* — McCormick, Paulding &
Huber PLLC

(57) ABSTRACT

A flow-rate control valve 10*a* includes: a housing including
a valve body configured to regulate an opening degree of a
flow channel to be reciprocable, formed therein; a driving
force transmission mechanism 31 provided in the housing
and including a valve driving shaft driving a valve body, a
hollow screw shaft 40 screwed to the valve driving shaft and
a rotator 36 configured to rotate the hollow screw shaft 40;
and a drive mechanism 53 including actuators 54 and 55
with a piston 61 embedded therein, the piston 61 is provided
with a lever 66 engaged with engaging sections provided on
the rotator 36, and the rotator 36 is rotated to a constant
angle through the lever 66 by reciprocation of the piston 61
to regulate the opening degree of the flow channel by the
valve body.

18 Claims, 13 Drawing Sheets

(56) References Cited

U.S. PATENT DOCUMENTS

| | | | | |
|---|---|---|---|---|
| 3,428,291 | A * | 2/1969 | Callahan, Jr. | F16K 51/02 |
| | | | | 251/284 |
| 3,505,888 | A * | 4/1970 | Denkowski | F16K 31/047 |
| | | | | 192/38 |
| 4,346,728 | A * | 8/1982 | Sulzer | F16K 31/04 |
| | | | | 74/25 |
| 4,350,322 | A * | 9/1982 | Mueller | F16K 31/5284 |
| | | | | 74/25 |
| 4,460,009 | A * | 7/1984 | Nanci | F16K 31/163 |
| | | | | 451/430 |
| 4,928,919 | A * | 5/1990 | Daicho | F16K 1/305 |
| | | | | 251/297 |
| 5,419,530 | A * | 5/1995 | Kumar | F16K 31/506 |
| | | | | 251/285 |
| 6,446,660 | B1 * | 9/2002 | Goni Usabiaga | F16K 31/53 |
| | | | | 74/665 Q |
| 9,581,261 | B2 * | 2/2017 | Jannotta | F16K 1/02 |
| 9,657,862 | B1 * | 5/2017 | Andersen | F16K 5/22 |
| 9,897,231 | B2 * | 2/2018 | Thornburrow | F16K 1/04 |
| 10,018,282 | B2 * | 7/2018 | Hirai | G05D 16/185 |
| 11,415,197 | B2 * | 8/2022 | Kopecek | F16H 37/041 |
| 11,473,697 | B2 * | 10/2022 | Ueno | F16K 35/027 |
| 2001/0004106 | A1 * | 6/2001 | Waragai | F16K 3/0254 |
| | | | | 251/250 |
| 2009/0121170 | A1 * | 5/2009 | Ito | F16K 3/0254 |
| | | | | 251/129.12 |
| 2015/0107704 | A1 * | 4/2015 | Shishido | F16K 37/0016 |
| | | | | 137/556 |
| 2019/0331228 | A1 * | 10/2019 | Bowman | A01G 27/008 |
| 2025/0075808 | A1 * | 3/2025 | Kanai | F16K 31/1221 |
| 2025/0207684 | A1 * | 6/2025 | Kanai | F16K 7/16 |

* cited by examiner ( A )

( B )

(A)

(B)

( A )

( B )

( C )

( A )     ( B )

(1)       (2)       (3)       (4)

(8)       (7)       (6)       (5)

( A )          ( B )

FLOW-RATE CONTROL VALVE ACTUATOR

CROSS-REFERENCE TO RELATED APPLICATIONS

This application is a National Stage application of International Patent Application No. PCT/JP2023/011012, filed on Mar. 20, 2023, which claims priority to Japanese Patent Application No. 2022-056391, filed Mar. 30, 2022, and Japanese Patent Application No. 2023-026189, filed Feb. 22, 2023 each of which is hereby incorporated by reference in their entirety.

TECHNICAL FIELD

The present invention relates to a flow-rate control valve configured to control a flow rate of a fluid by using a valve body to regulate an opening degree of a flow channel.

BACKGROUND

A flow-rate control valve is used in order to control a speed of an actuator such as a cylinder driven by a fluid such as compressed air, control a flow rate of a fluid discharged from a nozzle or the like. The flow-rate control valve includes a valve body configured to regulate an opening degree of a flow channel, and the valve body in the flow-rate control valve adopts a diaphragm valve, a needle valve, a poppet valve, a spool valve, or the like. In regulating an opening degree of a related-art flow channel, a flow-rate regulator valve is directly operated. However, there is the increasing need to remotely operate the opening degree of the flow channel. A flow-rate control valve configured to remotely operate the regulation of the opening degree of the flow channel is of a type using an electric motor to drive the valve body or a type using a fluid pressure regulated by an electropneumatic regulator to drive the valve body.

A flow-rate regulator valve described in Patent Document 1 includes a diaphragm attached to a shaft configured to drive a valve body, and an opening degree of a flow channel is regulated by the valve body because of the pressure of air applied to the diaphragm. The pressure of air supplied to the flow-rate regulator valve is regulated by an electropneumatic regulator, and a flow rate of a fluid passing through the flow channel is detected by a flowmeter. A pressure of air supplied to the diaphragm by the electropneumatic regulator is feed-back controlled. Further, a state in which the opening degree of the flow channel is fixed and a state in which the opening degree is unfixed can be switched to each other by a fixing mechanism, irrespective of the pressure of air.

Japanese Patent Application Laid-open Publication No. 2021-32346

SUMMARY

By use of a flow-rate regulator valve of a type in which a valve body is driven by an electric motor, the temperature of the fluid flowing in the flow-rate regulator valve varies due to heat of the motor.

As described in the Patent Document 1, in order to accurately control air pressure applied to the shaft by the electropneumatic regulator for regulating the opening degree of the flow channel by the valve body, the structure of the flow-rate control valve including the electropneumatic regulator is complicated, and the flow rate cannot be easily regulated. Further, if the fixing mechanism is mounted, operations of the flow-rate regulator valve including the fixing mechanism are complicated.

An objective of the present invention is to provide a flow-rate control valve capable of accurately controlling a flow rate of a fluid flowing in a flow channel by simple operations.

A flow-rate control valve according to the present invention includes: a flow channel block including a flow channel configured to guide a fluid, formed therein; a housing provided in the flow channel block and provided with a valve assembly to be reciprocable, the valve assembly including a valve body configured to regulate an opening degree of the flow channel; a driving force transmission mechanism provided in the housing and including an adjusting screw member rotatably provided and configured to adjust a position of the valve body on a basis of the number of rotations, a rotator configured to rotate the adjusting screw member, and a pressing section provided on the rotator; a drive mechanism including an actuator with a reciprocating member embedded therein and provided in the driving force transmission mechanism; a lever swingably mounted on the reciprocating member and provided with a first contact section in contact with the pressing section when the reciprocating member moves forward and a second contact section in contact with the pressing section when the reciprocating member moves backward; and a swing regulating section provided in the reciprocating member and configured to regulate swing of the lever at least when the first contact section is in contact with the pressing section, and the rotator is rotated to a constant angle by reciprocation of the reciprocating member to regulate the opening degree of the flow channel by using the valve body.

The flow-rate control valve includes: the adjusting screw member configured to drive, in an axial direction, the valve driving shaft regulating the opening degree of the flow channel by the valve body; the rotator configured to rotate the adjusting screw member; and the drive mechanism configured to drive the reciprocating member provided with the lever driving the rotator, and the opening degree of the flow channel by the valve body is regulated by the reciprocating member embedded in the drive mechanism, and therefore, the opening degree of the flow channel can be accurately regulated with a simple structure.

BRIEF DESCRIPTION OF THE DRAWINGS

FIG. 13(A) illustrates similar components as in FIG. 10(A), and FIG. 13(B) illustrates similar components as in FIG. 10(A).

DETAILED DESCRIPTION

Embodiments of the present invention will be described below in detail with reference to the drawings.
Flow Channel Block The embodiments of the present invention will be described below in detail with reference to the drawings. The components that are in common are denoted with the same reference symbols in each of drawings.

Figure 1:
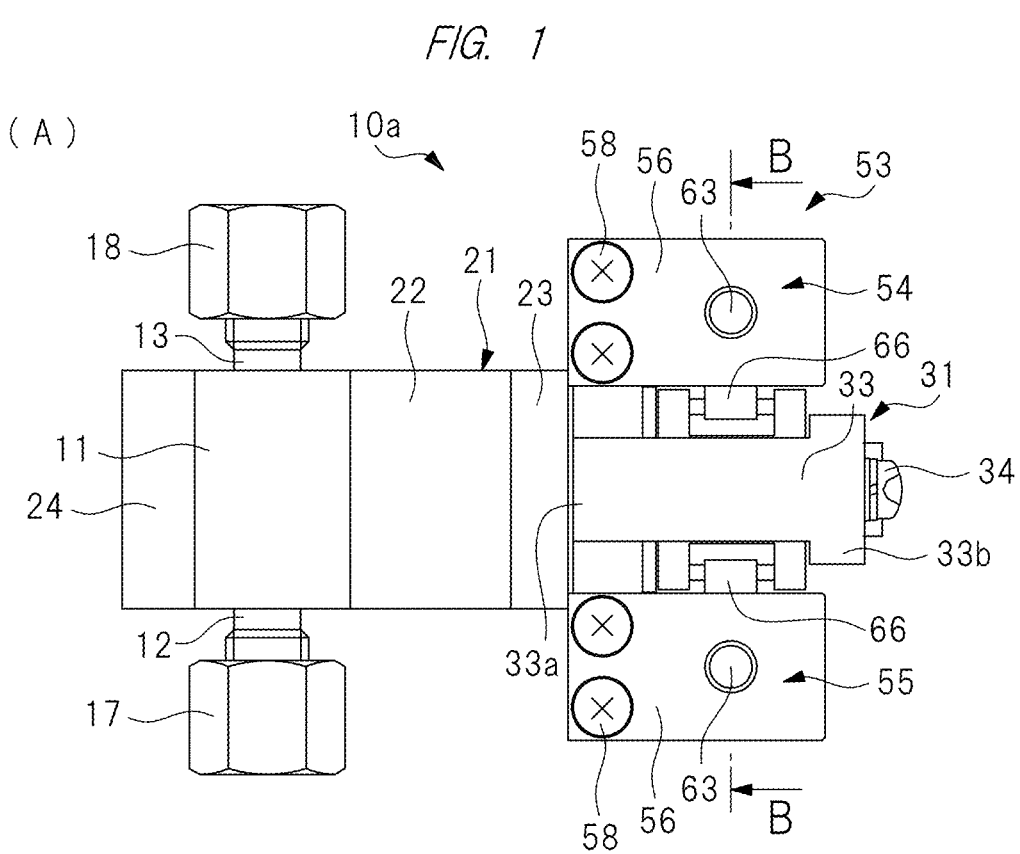
FIG. 1(A) is a front view illustrating a flow-rate control valve according to one embodiment.
FIG. 1(B) is a plan view of FIG. 1(A).
Figure 1:
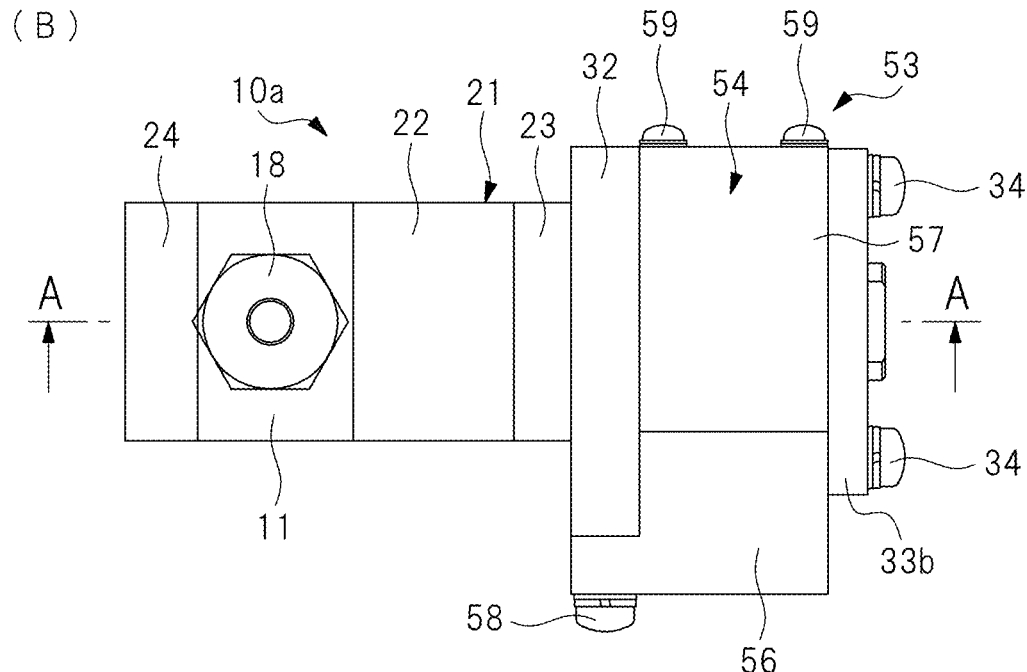
Figure 2:
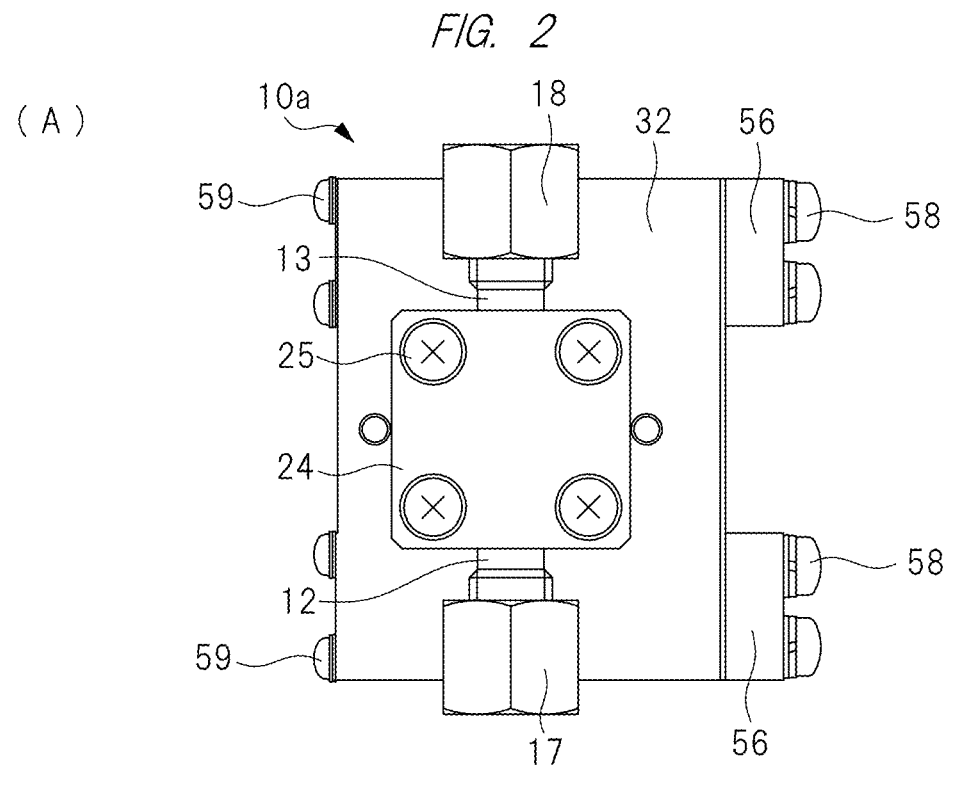
FIG. 2(A) is a left-side view of FIG. 1(A)
FIG. 2(B) is a right-side view of FIG. 1(A).
Figure 2:
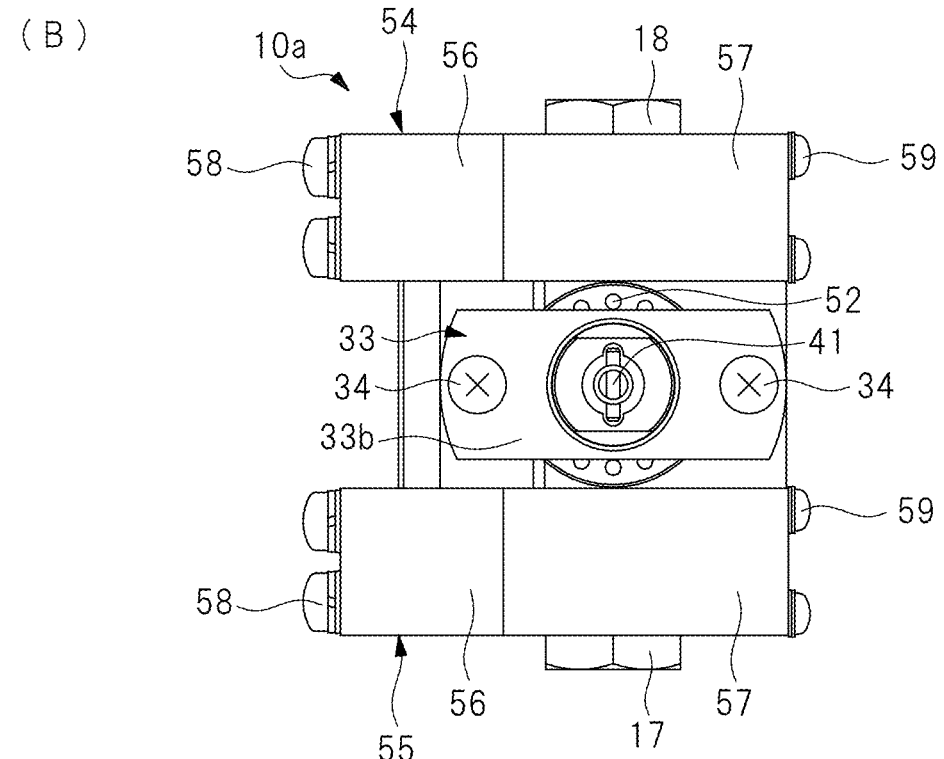
Figure 3:
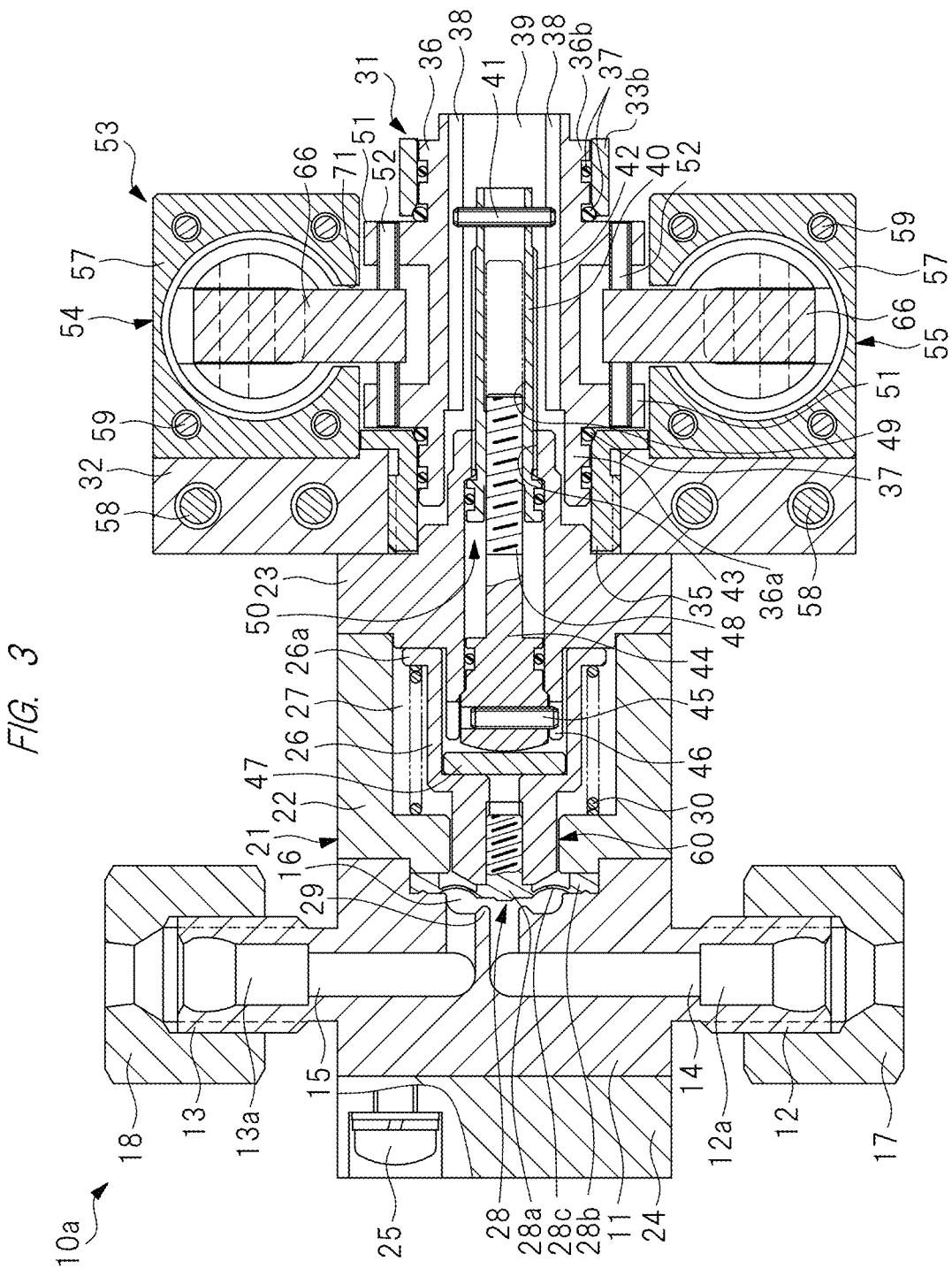
FIG. 3 is an enlarged cross-sectional view taken along the line A-A of FIG. 1(B).

As illustrated in FIG. 1 to FIG. 3, a flow-rate control valve 10$a$ includes a flow channel block 11, the flow channel block 11 is provided with a first joint 12 where a first port 12$a$ is formed and a second joint 13 where a second port 13$a$ is formed, and both the joints 12 and 13 are formed in the same straight line. As illustrated in FIG. 3, a flow channel 14 in communication with the first port 12$a$ to guide a fluid and a flow channel 15 in communication with the second port 13$a$ to guide a fluid communicate with each other through a communicating section 16 forming part of each of the flow channels. The flow channels 14, 15 and the communicating section 16 provided in the flow channel block 11 form a flow channel configured to guide the fluid.

A pipe such as a hose not illustrated is mounted on the joint 12 by a union nut 17 attached to the first joint 12, and a pipe is mounted on the joint 13 by a union nut 18 attached to the second joint 13. One end of each hose is at the fluid supply side and the other end thereof is at the fluid discharge side. A fluid supplied to one port passes through the flow channels 14, 15 and the communicating section 16 and is supplied from the other port to the outside.
Housing The flow channel block 11 is provided with a housing 21. As illustrated in FIG. 3, the housing 21 includes a valve body housing block 22 attached to the flow channel block 11, and a coupling member 23 is attached to the valve body housing block 22. An attachment plate 24 abuts on the flow channel block 11, and the flow channel block 11 and the valve body housing block 22 are assembled between the coupling member 23 and the attachment plate 24 and are fastened to the coupling member 23 by a screw member 25. A valve holder 26 is arranged in an enclosure 27 formed in the valve body housing block 22, a valve body 28 is mounted on the valve holder 26, and the valve body 28 can be reciprocated in the axial direction by the valve holder 26.

The valve body 28 includes a shaft section 28$a$ attached to one end of the valve holder 26, an annular section 28$b$ fastened between the flow channel block 11 and the valve body housing block 22, and a diaphragm section 28$c$ between the shaft section 28$a$ and the annular section 28$b$, and the valve body 28 is a diaphragm valve.

The valve body 28 forms the communicating section 16 as part of the flow channel between the valve body 28 and the flow channel block 11. When the valve body 28 is in contact with a valve seat 29, the flow channel is closed at the communicating section 16, and communication between the flow channels 14 and 15 is shut off. To the contrary, when the valve body 28 moves away from the valve seat 29, the opening degree of the communication of the communicating section 16, that is the opening degree of the flow channel, increases. A compressed coil spring 30 is arranged in the enclosure 27, and one end of the compressed coil spring 30 abuts on the bottom surface of the enclosure 27 while the other end thereof abuts on a flange 26$a$ of the valve holder 26. The compressed coil spring 30 biases, toward the valve holder 26, spring force in a direction of bringing the valve body 28 away from the valve seat 29. When the flange 26$a$ of the valve holder 26 is abutted on the coupling member 23 by the spring force, the opening degree of the flow channel at the communicating section 16 is maximized. FIG. 3 illustrates a state in which the valve body 28 is farthest from the valve seat 29 to achieve the maximized opening degree of the flow channel.
Driving Force Transmission Mechanism A driving force transmission mechanism 31 is provided in the coupling member 23 of the housing 21. As illustrated in FIG. 3, the driving force transmission mechanism 31 includes a base plate 32 attached to the coupling member 23, and a support stage 33 is attached to the base plate 32. The support stage 33 includes two legs 33$a$ and a rotator support section 33$b$ configured to couple the ends of the legs 33$a$, and the legs 33$a$ are screwed to the base plate 32 by screw members 34. A guide member 35 is screwed to the base plate 32 and attached to the base plate 32.

A hollow rotator 36 is rotatably supported by the guide member 35 and the rotator support section 33$b$. One end 36$a$ of the rotator 36 is rotatably supported by the guide member 35 while the other end 36$b$ thereof is rotatably supported by the rotator support section 33$b$. O-rings 37 are mounted between one end 36$a$ of the rotator 36 and the guide member 35 and between the other end 36$b$ and the rotator support member 33$b$, respectively. Each of the O-rings 37 configures a braking member configured to apply rotational resistance to the rotator 36.

Two guide grooves 38 extending in the axial direction are formed on the inner surface 39 of the rotator 36. The two guide grooves 38 shift from each other by 180 degrees in the rotation direction of the rotator 36, and face each other. A hollow screw shaft 40 is mounted inside the rotator 36 to be rotatable and movable in the axial direction. A guide pin 41 is attached at an outer end of the hollow screw shaft 40 to cross the hollow screw shaft 40, and both ends of the guide pin 41 engage with the guide grooves 38. Therefore, by the rotation of the rotator 36, the rotation motion is transmitted to the hollow screw shaft 40 through the guide pin 41. Further, a male screw 42 formed on the outer periphery of the hollow screw shaft 40 is screwed to a female screw 43 provided on the coupling member 23. Therefore, by the rotation of the rotator 36, the hollow screw shaft 40 is rotated along with the rotator 36, and is moved in the axial direction.

A valve driving shaft 44 made of a screw shaft is embedded inside the hollow screw shaft 40, and a guide pin 45 fixed at an inner end of the valve driving shaft 44 is slidably engaged with a guide groove 46 provided in the axial direction on the coupling member 23. An adjusting screw member 50 is made of the hollow screw shaft 40 and the valve driving shaft 44, and the adjusting screw member 50 is reciprocated in the axial direction by the rotation of the rotator 36.

The inner end surface of the valve driving shaft 44 abuts on the valve holder 26 through a plate 47, and the inner end surface is shaped into a convex arc surface toward the plate 47. A valve assembly 60 is made of the plate 47, the valve holder 26, and the valve body 28. That is, the plate 47 configures an abutting member abutting on the adjusting screw member 50. Therefore, when the valve driving shaft 44 is driven in the axial direction, the valve body 28 is driven in the axial direction by the valve holder 26 of the valve assembly 60. When the valve driving shaft 44 is driven toward the valve body 28, the valve body 28 moves toward the valve seat 29 to decrease the opening degree of the flow channel at the communicating section 16. A case of driving in the opposite direction increases the opening degree of the flow channel at the communicating section 16.

Differential Screw Mechanism

A male screw 48 formed on the outer periphery of the valve driving shaft 44 is screwed to a female screw 49 formed on the inner periphery of the hollow screw shaft 40. The male screws 42 and 48 are right-hand screws, and are slightly different from each other in pitch. For example, when a pitch of the male screw 42 is 0.5 mm while a pitch of the male screw 48 is 0.45 mm, the pitch difference is 0.05 mm. When the hollow screw shaft 40 is rotated once by the rotator 36, the valve driving shaft 44 moves by the slight pitch difference in the axial direction. In this way, the hollow screw shaft 40 is a differential screw including the female screw 49 and the male screw 42 that are different in pitch formed therein. If the adjusting screw member 50 made of the valve driving shaft 44 and the hollow screw shaft 40 has a differential screw mechanism, a axial-direction movement amount of the valve driving shaft 44 per the rotation of the hollow screw shaft 40 by the rotator 36 can be made small. As a result, the opening degree of the valve body 28 can be accurately set. Actually, the hollow screw shaft 40 and the valve driving shaft 44 may function as not the differential screw mechanism but a single screw mechanism to convert the rotation of the hollow screw shaft 40 by the rotator 36 into motion of the valve driving shaft 44 in the axial direction. For example, when only the valve driving shaft 44 and the hollow screw shaft 40 are screwed and coupled while the hollow screw shaft 40 is rotatably mounted on the coupling member 23 or when the hollow screw shaft 40 and the coupling member 23 are screwed and coupled such that the valve driving shaft 44 and the hollow screw shaft 40 rotate together, the rotation of the hollow screw shaft 40 by the rotator 36 can be converted into the motion of the valve driving shaft 44 in the axial direction.

Pin Gear Structure

Figure 4:
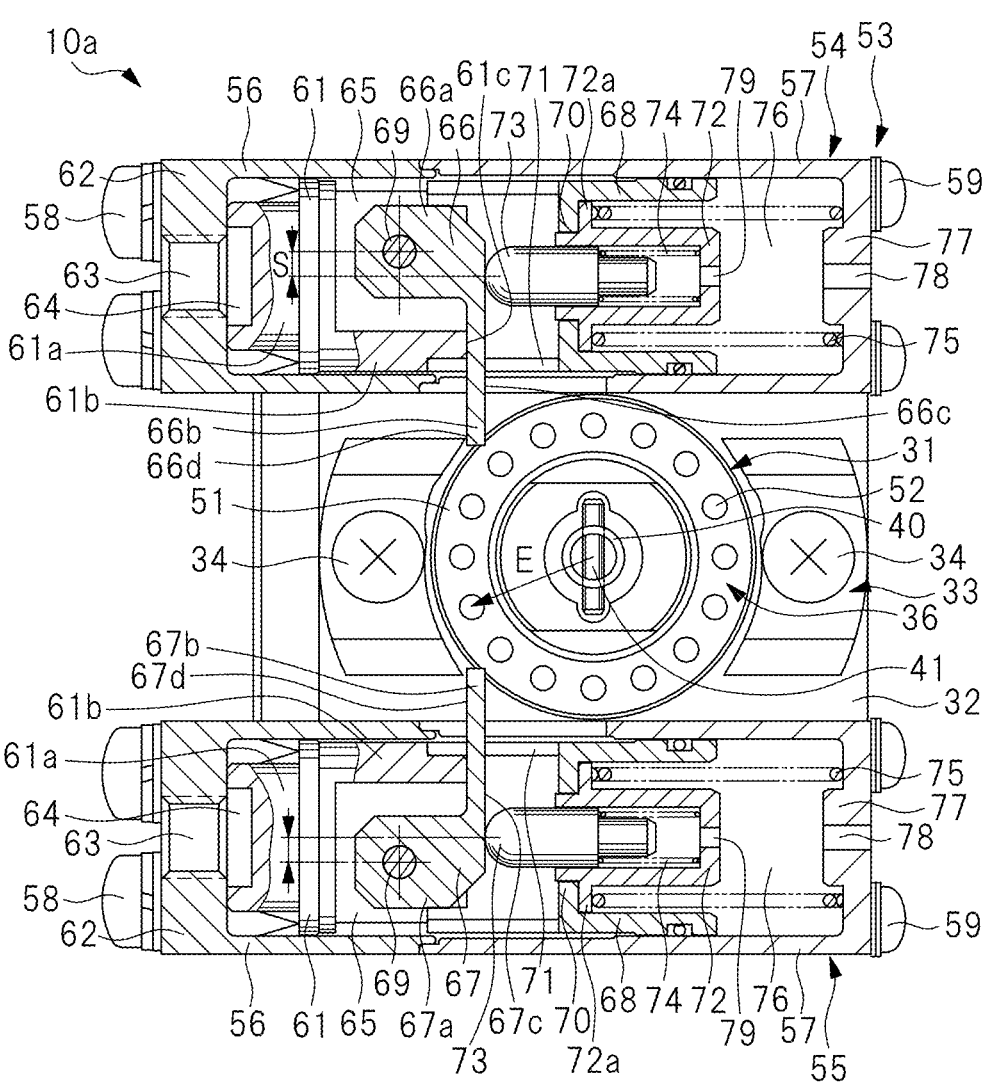
FIG. 4 is an enlarged cross-sectional view taken along the line B-B of FIG. 1(A) and illustrates a state without flow-rate regulation.

As illustrated in FIG. 3, the rotator 36 includes two flanges 51, and a plurality of engagement pins 52, each of which has a circular cross section, are provided as pressing sections on the flanges 51. As illustrated in FIG. 4, both ends of each engagement pin 52 are attached to the flange 51 at positions at the same radius (radius E) from the center of rotation of the rotator 36 at equal interval with each constant rotation angle, that is the same angle, in the circumferential direction, and 16 engagement pins 52 are attached to the rotator 36. Therefore, the engagement pins 52 are provided at every constant rotation angle (angle α) of 22.5 degrees in the rotation direction. In this way, the rotator 36 has a pin gear structure in which spaces are formed between the engagement pins 52 and in a portion of the engagement pins 52, the portion being radially inside the rotator 36. Note that the rotator support section 33*b* of the support stage 33 is partially cut out in FIG. 4 for illustrating the rotator 36.

Drive Mechanism

A drive mechanism 53 configured to rotate the rotator 36 is attached to the base plate 32. The drive mechanism 53 includes an actuator 54 for forward rotation and an actuator 55 for backward (reverse) rotation, and both the actuators 54 and 55 are arranged at both sides of the rotator 36 as illustrated in FIG. 3 and FIG. 4. In FIG. 4, if it is assumed that clockwise rotation of the rotator 36 is the forward rotation while counterclockwise rotation thereof is the backward rotation, the actuator 54 is an actuator for forward rotation configured to rotate the rotator 36 forward while the actuator 55 is an actuator for backward rotation. Rotation in either direction may be the forward rotation if the rotation directions of the two actuators 54 and 55 are opposite to each other.

The actuator 54 for forward rotation and the actuator 55 for backward rotation are in a similar structure, and are symmetrical to each other across a plane including the central axis of rotation of the rotator 36 and being along both the actuators 54 and 55. The actuator 54 for forward rotation is provided to rotate the rotator 36 forward, that is, clockwise in FIG. 4 to a constant angle. By the forward rotation of the rotator 36, the valve body 28 approaches the valve seat 29 and is driven to close the communicating section 16. To the contrary, the actuator 55 for backward rotation is provided to rotate the rotator 36 backward, that is, counterclockwise in FIG. 4 to a constant angle. By the backward rotation of the rotator 36, the valve body 28 moves away from the valve seat 29 and is driven to widen the flow channel of the communicating section 16.

Actuator for Forward Rotation

The actuator 54 for forward rotation includes a first cylinder 56 and a second cylinder 57, and is an actuator assembly. As illustrated in FIG. 1 and FIG. 2, the first cylinder 56 is attached to the base plate 32 by screw members 58 while the second cylinder 57 is attached to the first cylinder 56 by screw members 59.

First Piston

As illustrated in FIG. 4, a first piston 61 as a reciprocating member is mounted in the first cylinder 56 to be reciprocable in the axial direction, and the first piston 61 includes a top section 61*a* facing an end wall 62 of the first cylinder 56 and a tube section 61*b* closer to the opening of the first cylinder 56. By supply of the compressed fluid from a supply/discharge port 63 formed on the end wall 62 of the first cylinder 56 to a drive chamber 64 in the first cylinder 56, the first piston 61 is moved forward by the fluid pressure, and the rotator 36 is rotated forward.

A lever 66 for forward rotation is swingably mounted on a housing groove 65 formed on the tube section 61*b* by a support pin 69. As illustrated in FIG. 4, the lever 66 includes a base section 66*a* on which the support pin 69 is mounted and a lever piece 66*b* formed with the base section 66*a*. The lever 66 has a state in which the lever piece 66*b* abuts on a swing regulating section 61*c* provided at the opening end of the tube section 61*b* to regulate clockwise swing of the lever piece 66*b* in FIG. 4 and a state in which the lever piece 66*b* is not regulated by the swing regulating section 61*c* and swings counterclockwise in FIG. 4.

As illustrated in FIG. 4, when the first piston 61 moves forward from a non-contact state that is no contact of an engagement pin 52 with the lever 66 with the state in which the lever piece 66*b* abuts on the swing regulating section 61*c*, a first contact section 66*c* of the lever 66 is in contact with the engagement pin 52 in the state in which the lever piece 66*b* abuts on the swing regulating section 61*c* to regulate the swing. Then, when the lever 66 presses the engagement pin 52 during the forward movement, a moment larger than the rotational resistance caused by the braking member is applied to the rotator 36, and the lever 66 rotates the rotator 36 to cause the press state. To the contrary, when the first piston 61 moves backward, a second contact section 66*d* is in contact with an engagement pin 52 at a behind position in the rotation direction of the rotator 36. A moment applied to the rotator 36 through the engagement pin 52 by the lever 66 during the backward movement is smaller than the rotational resistance of the rotator 36 caused by the braking member, and thus, the lever 66 enters a swingable state to swing counterclockwise about the support pin 69 in FIG. 4 without pressing the engagement pin 52, that is, without rotating the rotator 36. In this manner, the lever 66 is switched among the non-contact state in which the lever 66 is not in contact with the engagement pin 52, the press state in which the lever 66 presses the engagement pin 52, and the swing state in which the lever 66 does not press the engagement pin 52. Note that the swing regulating section 61*c* may be replaced with a different regulating member capable of regulating swing of the lever 66 in the press state. For example, the swing of the lever 66 may be regulated by contact with the base section 66*a*, or by regulating the swing of the support pin 69.

Second Piston

As illustrated in FIG. 4, a second piston 68 configuring a reciprocating member is mounted in the second cylinder 57 to be reciprocable in the axial direction, and the second piston 68 is cylindrical and is provided with a partitioning wall 70 at its center in the axial direction. An abutting end surface of the partitioning wall 70 closer to the first piston 61 (at the left side of the partitioning wall 70 in FIG. 4) abuts on the end surface of the tube section 61*b* of the piston 61, and the second piston 68 reciprocates together with the first piston 61 in the axial direction. A cutout is provided between the end surface of the tube section 61*b* and the partitioning wall 70, and the second cylinder 57 is also provided with a cutout corresponding to the cutout to form a slit 71. The lever piece 66*b* of the lever 66 radially penetrates through the slit 71. The slit 71 is formed by forming part of the tube section 61*b* to have a concave shape. As illustrated in FIG. 4, the bottom of the concave shape is the swing regulating section 61*c*. A pin case 72 is attached to the partitioning wall 70, and the pin case 72 is embedded in an outer end of the second piston 68.

A return pin 73 is mounted on the pin case 72 to be movable in the axial direction, and spring force toward the lever 66 is applied to the return pin 73 by a compressed coil spring 74 embedded in the pin case 72. The compressed coil spring 74 applies weak force to the return pin 73 to be in contact with the lever 66, and configures, together with the return pin 73, a return mechanism configured to apply return force to the lever 66. A compressed coil spring 75 is embedded in a spring chamber 76 made of the second cylinder 57 and the second piston 68. One end of the compressed coil spring 75 abuts on a flange 72*a* of the pin case 72 while the other end thereof abuts on an end wall 77 of the second cylinder 57 to apply spring force for returning the first piston 61 to the second piston 68. A breath hole 78 communicating with the spring chamber 76 is formed on the end wall 77, and a breather hole 79 configured to communicate the inside of the pin case 72 and the spring chamber 76 is formed in the pin case 72.

The tip of the return pin 73 is spherical and has point-contact with the lever 66. The point-contact position shifts by a distance S from the central axis of the support pin 69, that is, from the central axis of the rotation of the lever 66 toward the tip of the lever piece 66*b* as illustrated in FIG. 4. Therefore, when the return mechanism operates, the lever 66 is pressed against the swing regulating section 61*c* of the first piston 61 by spring force of the compressed coil spring 74 applied by the return pin 73. As a result, when the first piston 61 moves forward, the return pin 73 brings the lever 66 into contact with the engagement pin 52, and positions the lever 66 to be in the drive state. To the contrary, when the first piston 61 moves backward, the lever 66 enters the swing state without being in contact with and pressing the engagement pin 52. Since the second cylinder 57 is provided with the slit 71, the second cylinder 57 permits the lever 66 to swing. At this time, by the swing of the lever 66, the return pin 73 is moved into the pin case 72 to be against the spring force of the compressed coil spring 74.

Operations of First Piston

Figure 5:
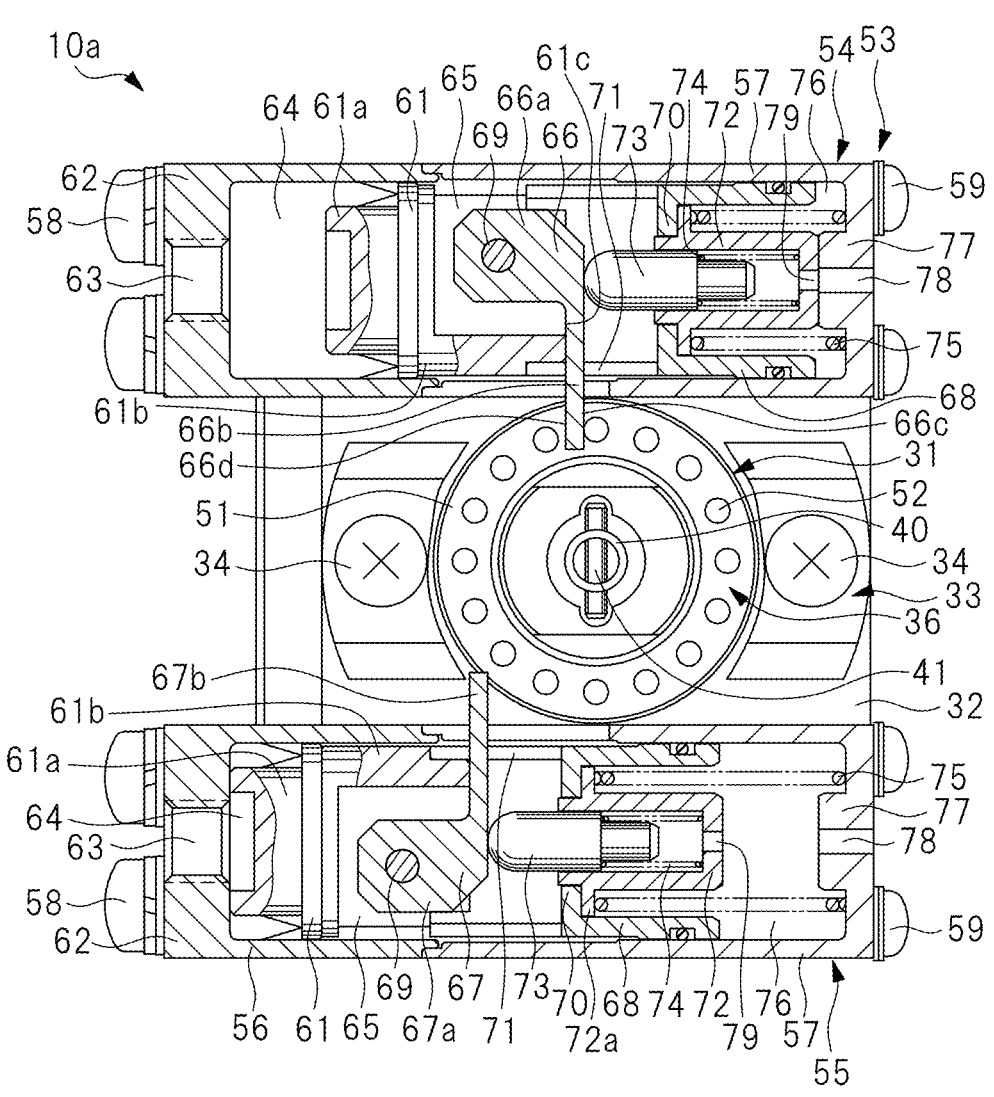
FIG. 5 is a cross-sectional view similar to FIG. 4 and illustrates a moving-forward state of a first piston.

When the pressurized fluid is supplied from the supply/discharge port 63 while the first piston 61 is at a backward-moving limit position where the first piston 61 abuts on the end wall 62 as illustrated in FIG. 4, the first piston 61 is moved forward, and the second piston 68 is also moved forward as illustrated in FIG. 5. As a result, the lever 66 of the actuator 54 for forward rotation moves forward and presses any of the engagement pins 52 in the state in which the lever piece 66*b* abuts on the swing regulating section 61*c* of the first piston 61. When the first piston 61 is driven to a forward-moving limit position, the rotator 36 is rotated to a constant angle corresponding to the shift angle $\alpha$ (22.5°) by the lever 66.

Figure 6:
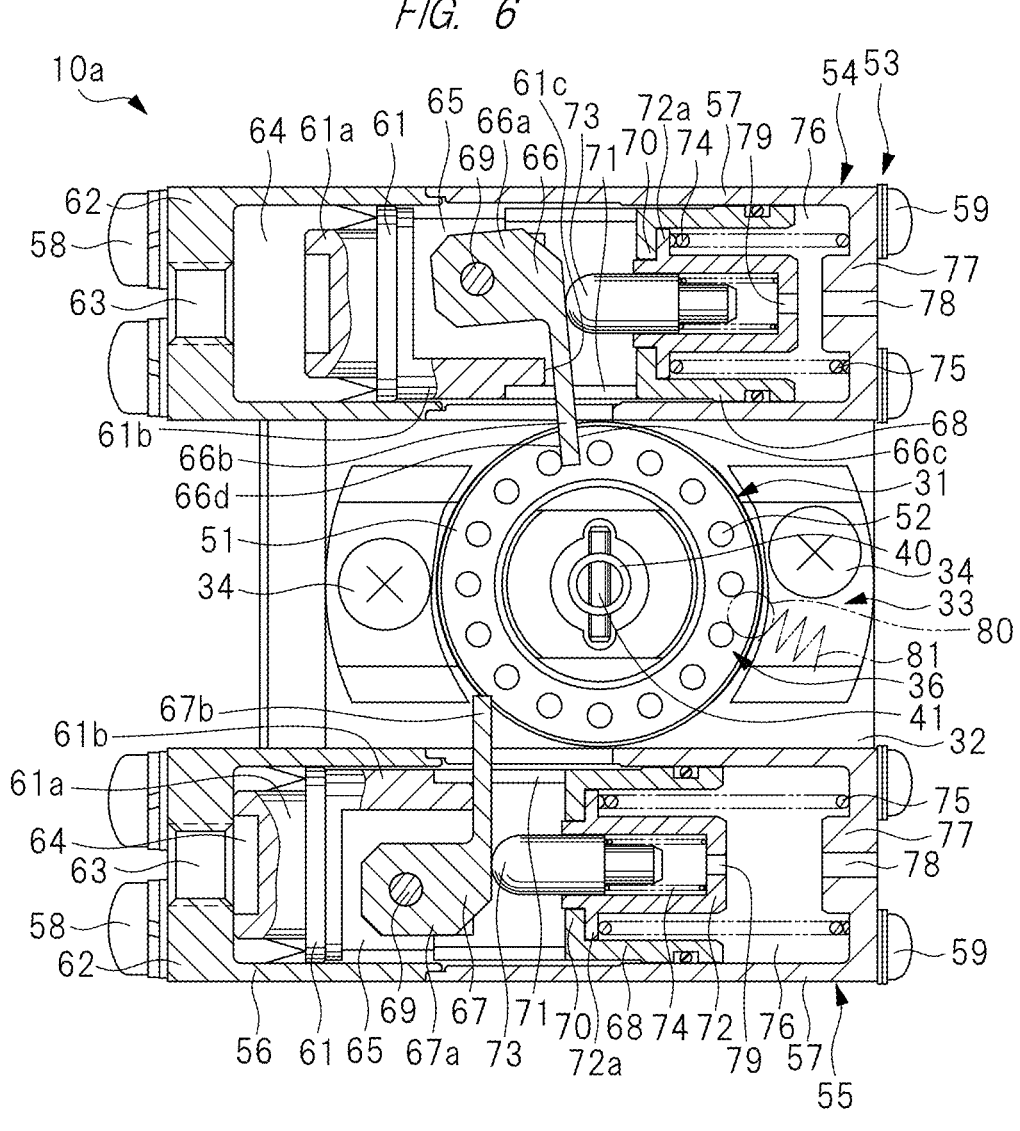
FIG. 6 is a cross-sectional view similar to FIG. 4 and illustrates a moving-backward state of the first piston.

When the pressurized fluid supplied to the drive chamber 64 is discharged to the outside, the first piston 61 is, by spring force of the compressed coil spring 75, moved backward to a position where the first piston 61 is abutted on the end wall 62 by the second piston 68 as illustrated in FIG. 4. When the first piston 61 moves backward, the lever 66 is in contact with one engagement pin 52 before the engagement pin in the rotation direction of the rotator 36 as illustrated in FIG. 6. The lever 66 enters the swingable state to swing counterclockwise about the support pin 69 in FIG. 4, and thus, the first piston 61 is returned to the backward-moving limit position without the pressing of the engagement pin 52 and the reverse rotation of the rotator 36.

As described above, the actuator 54 for forward rotation rotates the rotator 36 forward to the constant angle through the lever 66 for forward rotation by using the reciprocation of the pistons 61 and 68 as the reciprocating members for forward rotation.

In the first piston 61 of the actuator 54 for forward rotation, a direction of being away from the end wall 62 of the cylinder 56 is the forward-moving direction, and its opposite direction is the backward-moving direction. When the piston 61 moves forward, the second piston 68 also moves forward. When the piston 61 moves backward, the second piston 68 also moves backward. When the piston 61 of the actuator 54 for forward rotation moves forward, the rotator 36 is rotated forward. Even if the first piston 61 moves forward and then moves backward, the rotational resistance is applied to the rotator 36 by the O-rings 37, and thus, the rotator 36 is prevented from rotating.

Actuator for Backward Rotation

As illustrated in FIG. 4, the actuator 55 for backward rotation is in a similar structure to the actuator 54 for forward rotation, and is symmetrical to the actuator 54 across the rotator 36. The components that are common with the components configuring the actuator 54 for forward rotation are denoted with the same reference symbols, and the repetitive description thereof is omitted. In the actuator 55 for backward rotation, a lever 67 for backward rotation in a similar structure to the lever 66 for forward rotation is swingably mounted on the tube section 61*b* of the piston 61 by the support pin 69. As similar to the lever 66 for forward rotation, the lever 67 for backward rotation includes a base section 67*a*, a lever piece 67*b*, a first contact section 67*c*, and a second contact section 67*d*, and rotates the rotator 36 backward to the constant angle through the lever 67 for backward rotation by using the reciprocation of the pistons 61 and 68 as the reciprocating members for backward rotation.

When the piston 61 of the actuator 55 for backward rotation moves forward, the rotator 36 is rotated backward. That is, when the first piston 61 of the actuator 55 for backward rotation is moved rightward in FIG. 4, the rotator 36 is rotated backward, that is, rotated counterclockwise in FIG. 4. As a result, the valve body 28 moves aways from the valve seat 29, and is driven to widen the flow channel of the communicating section 16.

Steps of Forward Rotation of Rotator

Figure 7:
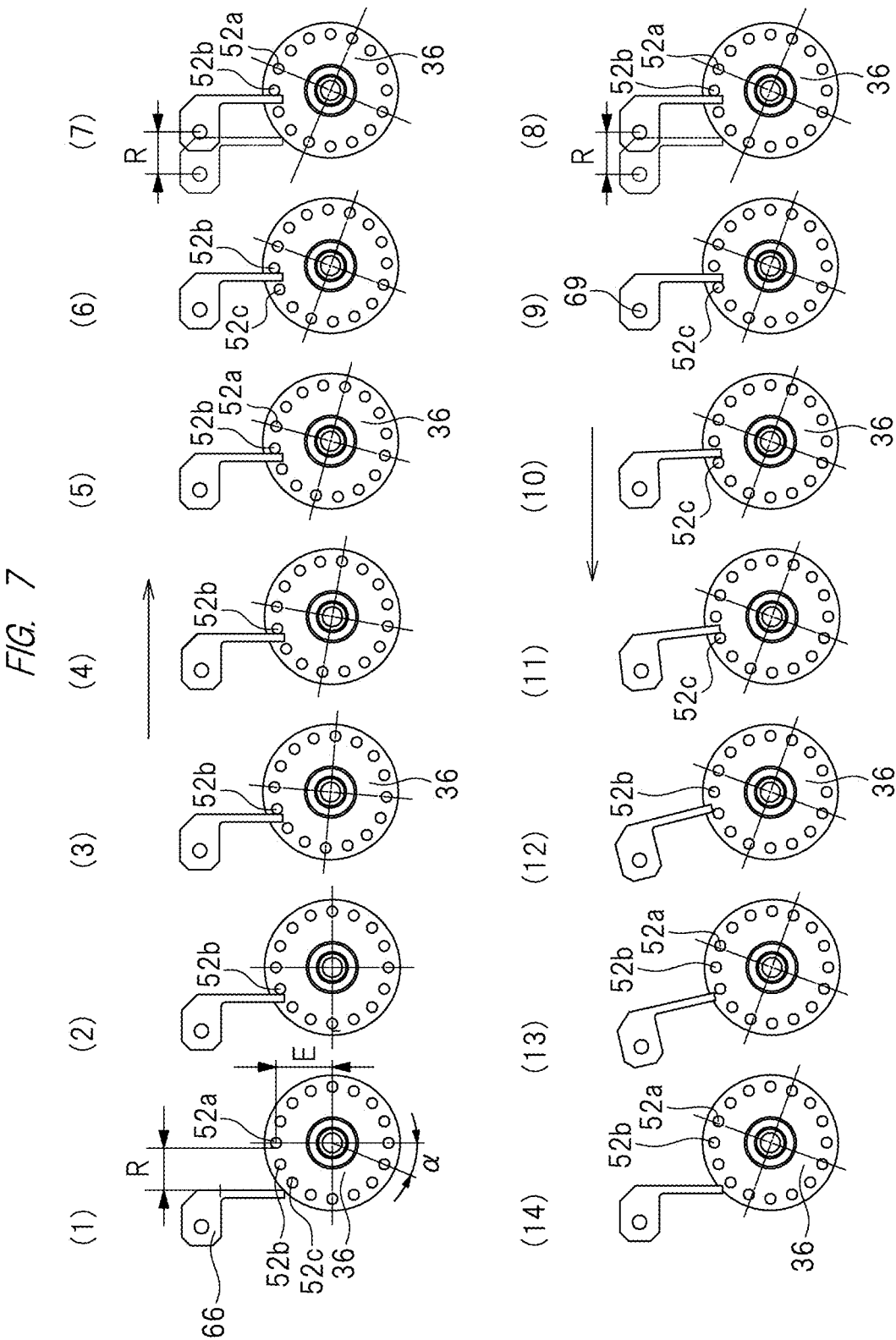
FIG. 7 is a step flowchart illustrating a moving state of a lever for forward rotation for use in regulating a valve body at a constant opening degree.

FIG. 7 is a step flowchart illustrating a moving state of the lever 66 for forward rotation for use in regulating the valve body 28 at a constant opening degree by the rotation of the rotator 36 by the first piston 61 of the actuator 54 for forward rotation.

In FIG. 7, step (1) indicates a position of the lever 66 corresponding to the backward-moving limit position of the first piston 61, and step (7) indicates a position of the lever 66 corresponding to the forward-moving limit position of the first piston 61. The tip of the lever piece 66*b* presses the engagement pin 52 at the second position from the radial direction along the lever piece 66*b* among the engagement pins 52 provided on the rotator 36. For example, if it is assumed in FIG. 7 that an engagement pin closest to the actuator 54 is an engagement pin 52*a*, an engagement pin behind the engagement pin 52*a* is an engagement pin 52*b*, and an engagement pin further behind the engagement pin 52*a* is an engagement pin 52*b*, the lever 66 at the backward-moving limit position and the engagement pin 52*a* separate from each other by a distance corresponding to a stroke R of the piston 61. The stroke R corresponds to a distance between the pin case 72 and the end wall 77 in FIG. 4.

In this state, by supply of the fluid pressure from the supply/discharge port 63 to the drive chamber 64, the lever 66 is in contact with the engagement pin 52*b* in step (2). In step (2) to step (7), the larger the forward-moving amount of the first piston 61 is, the more the press amount of the lever 66 to the engagement pin 52*b* is. At this time, the lever 66 is fixed at the drive state position, and thus, the moment larger than the rotational resistance caused by the braking member is applied to the rotator 36. As a result, the rotator 36 rotates forward. At this time, the tip of the lever piece 66*b* is inserted between the engagement pin 52*b* and the engagement pin 52*c*. As illustrated in step (1) to step (7), even if the contact position between the engagement pin 52*b* and the lever 66 is changed by the movement of the lever 66, the lever 66 presses the engagement pin 52*b* toward the center of the engagement pin 52*b*, and thus, the rotator 36 can be rotated to the constant angle.

Then, in discharge of the fluid in the drive chamber 64, the second piston 68 presses the first piston 61 by using spring force, and the first piston 61 is driven toward the backward-moving limit position. At this time, the lever 66 is in a swingable state to swing about the support pin 69 as illustrated in step (8) to step (14). Thus, even if the lever 66 is in contact with the engagement pin 52*c* in step (9) to step (12), the moment applied to the rotator 36 by the engagement pin 52*c* is smaller than the rotational resistance caused by the braking member, and the rotator 36 does not reversely rotate.

As a result, the rotator 36 is rotated to an angle corresponding to the distance between the pins. The rotator 36 is provided with 16 engagement pins 52, and thus, the angle α between the adjacent engagement pins 52 in the rotation direction is 22.5°. If the number of the engagement pins 52 is changed to change the angle α between the pins, an angle to which the rotator 36 is rotated by one reciprocation motion of the first piston 61 can be changed.

Steps of Backward Rotation of Rotator

FIG. 7 illustrates the step of the rotation of the rotator 36 by the actuator 54 for forward rotation. However, the rotator can be also reversely rotated through the similar step by the actuator 55 for backward rotation.

As described above, when the rotator 36 is rotated clockwise in FIG. 4 by the actuator 54 for forward rotation, the valve body 28 is driven to close the flow channel. To the contrary, when the actuator 55 for backward rotation is reciprocated, the rotator 36 is rotated counterclockwise, and the valve body 28 is driven to widen the degree of the opening of the flow channel.

In the flow-rate control valve 10*a*, the valve driving shaft 44 abuts on the valve holder 26 through the plate 47, and the valve body 28 is regulated at an optional position away from the valve seat 29. In the respective actuators 54 and 55, the rotator 36 is rotated to the distance between the engagement pins by the lever 66 of the first piston 61 reciprocated by fluid pressure, the rotation motion of the rotator 36 is transmitted to the hollow screw shaft 40, and the moving amount of the valve body 28 is regulated by the adjusting screw member 50. The opening degree of the flow channel can be set based on the number of reciprocation motions of the actuator 54 for forward rotation and the number of reciprocation motions of the actuator 55 for backward rotation. The number of reciprocation motions of the actuator 54 for forward rotation and the reciprocation of the actuator 55 for backward rotation are controlled by an electromagnetic valve not illustrated to remotely regulate the opening degree of the flow channel in the flow-rate control valve 10*a*. In this manner, the hollow screw shaft 40 is rotated by reciprocation of the first piston 61 and the second piston 68 to regulate the opening degree of the valve body 28, and thus, this manner does not need the complicated control and settings in comparison with the case of the drive of the valve body under use of the electropneumatic regulator or the electric motor, and thus, the flow rate of the fluid in the flow channel can be accurately regulated by the simple structure and control. Further, since the electric motor is not used, the temperature of the fluid flowing in the flow-rate control valve does not change. Additionally, the flow-rate control valve 10*a* can be also placed in environments where the electric motor cannot be placed. Furthermore, if the hollow screw shaft 40 is of the differential screw, the moving amount of the valve body 28 by the rotation of the rotator 36 can be set to be small, and the flow-rate regulating accuracy can be increased.

FIG. 6 illustrates a sphere 80, and the sphere 80 is mounted on the legs 33*a* of the support stage 33 to be movable in the radial direction of the rotator 36. Spring force is applied by a spring member 81 such that the sphere 80 applies pressing force to the engagement pins 52 from the outside in the radial direction, and the sphere 80 and the O-rings 37 configure the braking members configured to apply the rotational resistance to the rotator 36. The sphere 80 as the braking member may be provided on both the legs 33*a*, and the sphere 80 may be used as the braking member instead of the O-ring 37. As described above, the braking member applies the rotational resistance to the rotator 36 such that the rotator 36 rotates only when the moment larger than the rotational resistance is applied to the rotator 36, and thus, the flow rate can be regulated only by the simple operation that is the reciprocation of the actuator 54 for forward rotation or the actuator 55 for backward rotation performed a predetermined number of times.

Another Embodiment

Figure 8:
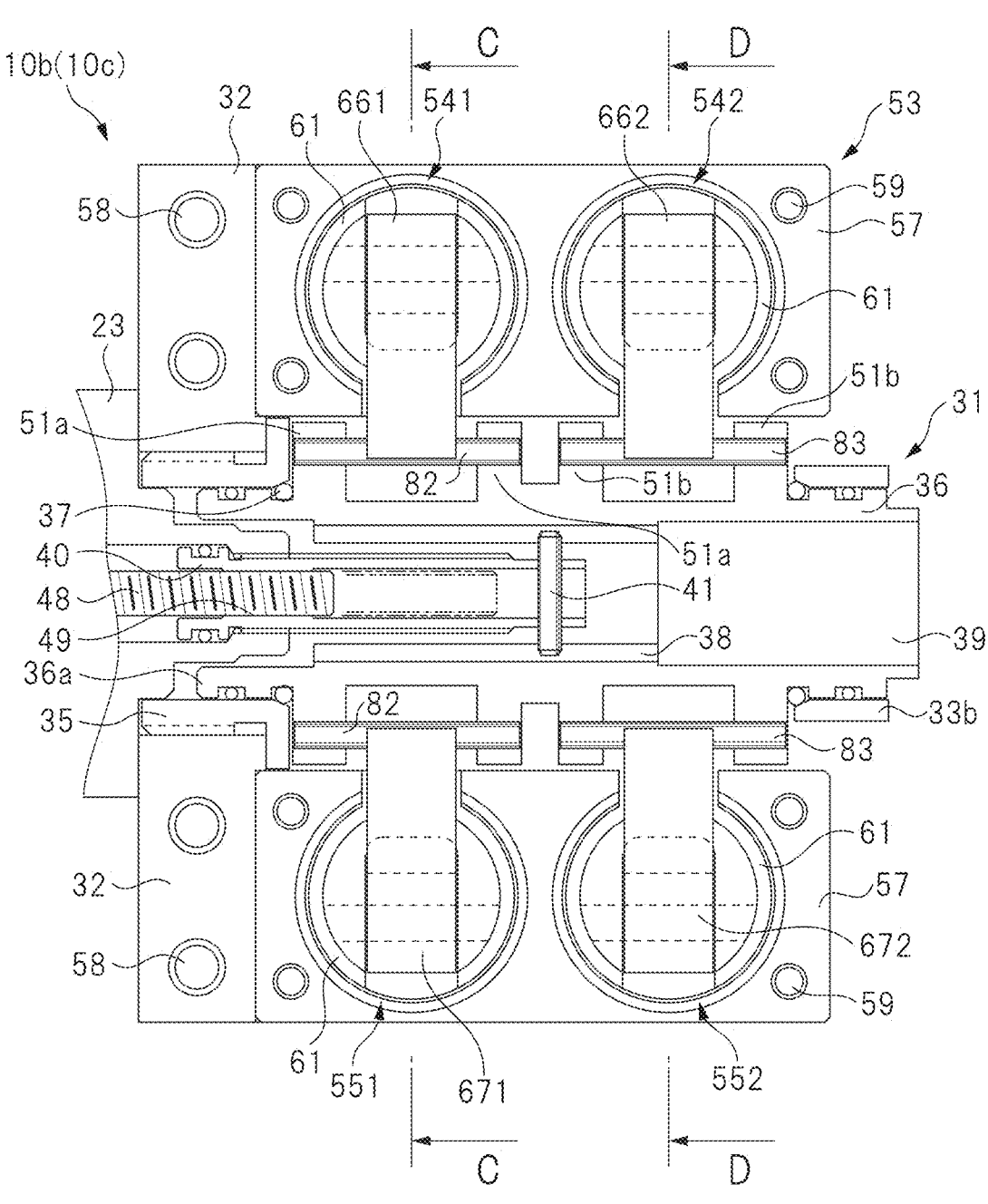
FIG. 8 is an enlarged cross-sectional view illustrating a drive mechanism and a driving force transmission mechanism in a flow-rate control valve according to another embodiment.

FIG. 8 is an enlarged cross-sectional view illustrating the drive mechanism 53 and the driving force transmission mechanism 31 in a flow-rate control valve 10*b* according to another embodiment. FIG. 9A is a front view illustrating an appearance of the rotator 36 of FIG. 8, FIG. 9B is a left-side view of FIG. 9A, and FIG. 9C is a right-side view of FIG. 9A. FIG. 10A is a cross-sectional view of the rotator 36 taken along the line C-C of FIG. 8, and FIG. 10(B) is a cross-sectional view of the rotator 36 taken along the line D-D of FIG. 8. In the drawings illustrating the flow-rate control valve 10*b*, components that are common with the components configuring the flow-rate control valve 10*a* are denoted with the same reference symbols.

Driving Force Transmission Mechanism

As illustrated in FIG. 8, the rotator 36 is provided with a pair of flanges 51*a* and a pair of flanges 51*b*. The flanges 51*a* is provided with a plurality of engagement pins 82, each of which has a circular cross section, as first pressing sections, and the flanges 51*b* is provided with engagement pins 83 each having the same shape as second pressing sections. Similarly to the engagement pins 52 in the flow-rate control valve 10*a*, the engagement pins 82 and 83 are provided at the same radius (radius E) position from the central axis of the rotation of the rotator 36 at every constant rotation angle (α), that is, at the same pitch in the circumferential direction.

Figure 9:
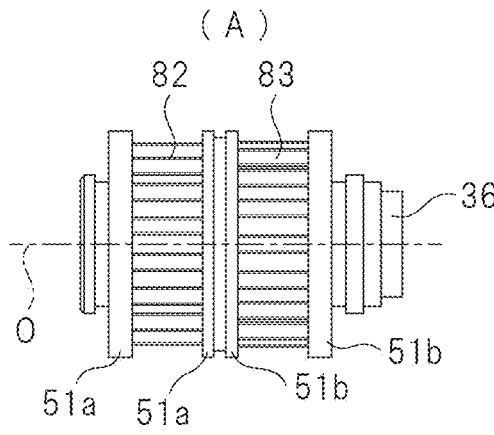
FIG. 9(A) is a front view illustrating an appearance of a rotator of FIG. 8.
FIG. 9(B) is a left-side view of FIG. 9(A)
FIG. 9(C) is a right-side view of FIG. 9(A).
Figure 9:
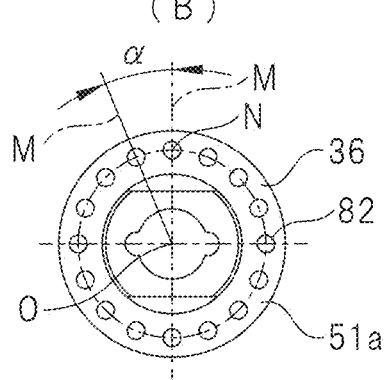
Figure 10:
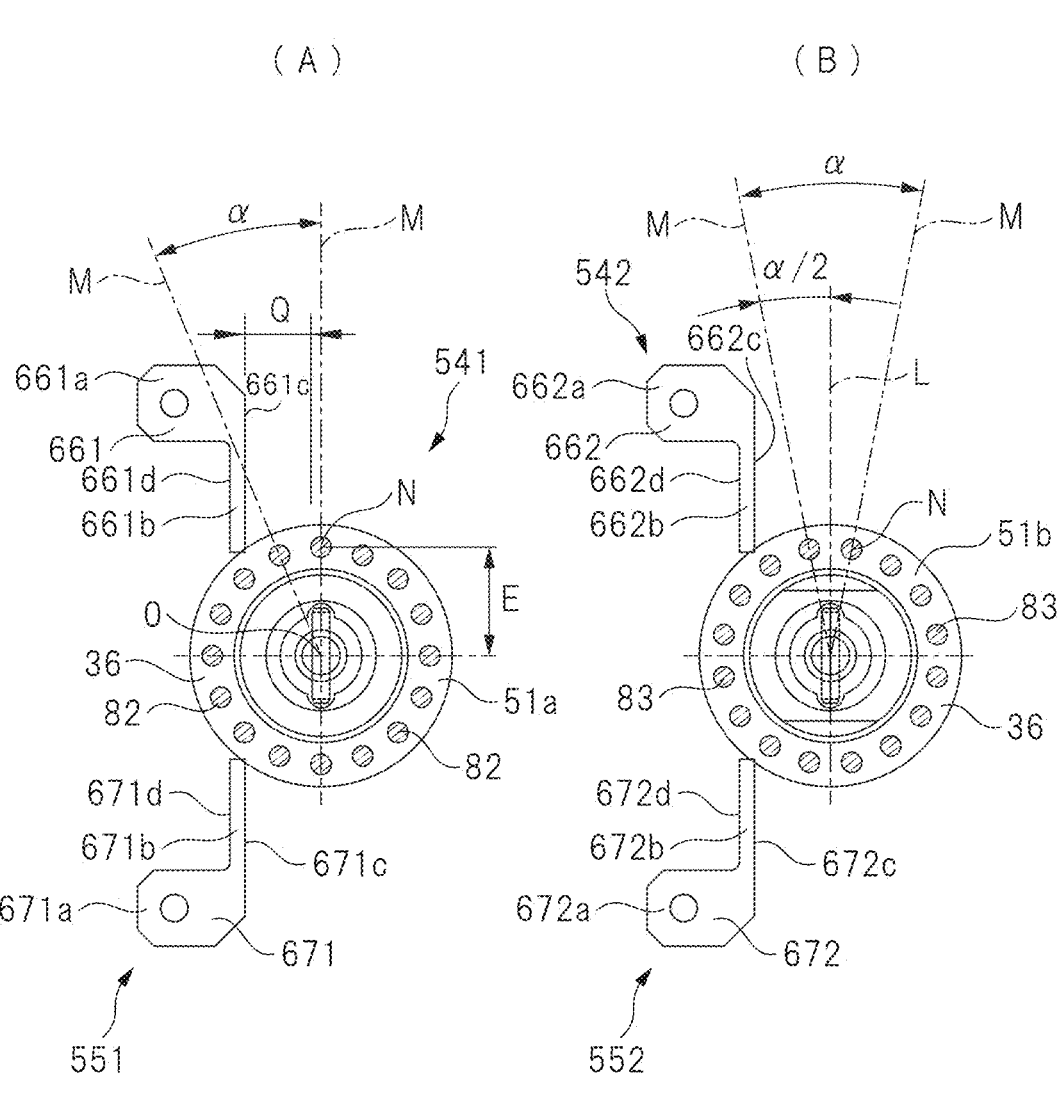
FIG. 10(A) is a cross-sectional view of the rotator taken along the line C-C of FIG. 8.
FIG. 10(B) is a cross-sectional view of the rotator taken along the line D-D of FIG. 8.

The numbers of the engagement pins 82 and 83 are each 16 similarly to the engagement pins 52, and are also the same in the outer diameter as the engagement pins 52. As illustrated in FIG. 9 and FIG. 10, a radial-direction line which radially extends between a rotation center O of the rotator 36 and a center N of any one engagement pin 82 is assumed as a pitch line M, and a radial-direction line which radially extends between the rotation center O of the rotator 36 and a center N of any one engagement pin 83 is also assumed as the pitch line M. An angle α in the circumferential direction between the pitch lines M of two circumferentially adjacent engagement pins 82 and an angle α in the circumferential direction between the pitch lines M of two circumferentially adjacent engagement pins 83, that is the pitch, are 22.5°. As illustrated in FIG. 10B, if a radial-direction line which radially extends between the circumferential centers between two circumferentially adjacent engagement pins 83 is assumed as an intermediate line L, the intermediate line L corresponds to the pitch line M of the engagement pin 82. That is, the engagement pin 82 as first pressing section and the engagement pin 83 as second pressing section shift from each other by ½ pitch in the rotation direction.

The structures of the hollow screw shaft 40 embedded in the rotator 36, the male screw 48 screwed to the hollow screw shaft 40, and the coupling member 23 are similar to those of the flow-rate control valve 10*a* illustrated in FIG. 3.

As similar to the case in FIG. 3, the coupling member 23 is coupled to the flow channel block 11 through the valve body housing block 22.

Drive Mechanism

As illustrated in FIG. 8, a first actuator 541 for forward rotation and a second actuator 542 for forward rotation are attached to the upper side of the base plate 32 in FIG. 8, and a first actuator 551 for backward rotation and a second actuator 552 for backward rotation are attached to the lower side of the base plate 32. The first actuator 541 for forward rotation and the second actuator 542 for forward rotation include an actuator assembly made of the first cylinder 56 and the second cylinder 57. Similarly, the first actuator 551 for backward rotation and the second actuator 552 for backward rotation also include an actuator assembly made of the first cylinder 56 and the second cylinder 57. Each of the cylinders 56 and 57 includes two actuators, and thus, is larger than the cylinder of the flow-rate control valve 10*a*.

The first actuator 541 for forward rotation and the first actuator 551 for backward rotation are arranged in the cross-section taken along the line C-C of FIG. 8, and the second actuator 542 for forward rotation and the second actuator 552 for backward rotation are arranged in the cross-section taken along the line D-D. In FIG. 8, the first piston 61 and the second piston 68 as first reciprocating members for forward rotation are embedded in the cylinders 56 and 57 configuring the first actuator 541 for forward rotation illustrated on the upper side. Further, the first piston 61 and the second piston 68 as second reciprocating members for forward rotation are embedded in the cylinders 56 and 57 configuring the second actuator 542 for forward rotation. In FIG. 8, the first piston 61 and the second piston 68 as first reciprocating members for backward rotation are embedded in the cylinders 56 and 57 configuring the first actuator 551 for backward rotation illustrated on the lower side. Further, the first piston 61 and the second piston 68 as second reciprocating members for backward rotation are embedded in the cylinders 56 and 57 configuring the second actuator 552 for backward rotation. The structures of the pistons 61 and 68 are similar to that of the flow-rate control valve 10*a*, and the repetitive description thereof is omitted.

Actuators for Forward Rotation

The piston 61 as the first reciprocating member configuring the first actuator 541 for forward rotation is provided with a first lever 661 for forward rotation, and the piston 61 as the second reciprocating member configuring the second actuator 542 for forward rotation is provided with a second lever 662 for forward rotation. The levers 661 and 662 are similar to the lever 66 for forward rotation in the actuator 54 for forward rotation, and include base sections 661*a*, 662*a*, lever pieces 661*b*, 662*b*, first contact sections 661*c*, 662*c*, and second contact sections 661*d*, 662*d* corresponding to the base section 66*a*, the lever piece 66*b*, the first contact section 66*c*, and the second contact section 66*d*, respectively. A stroke Q of the reciprocation of the piston 61 in each of the actuators 541 and 542 is half the stroke R of the actuator 54 for forward rotation.

As illustrated in FIG. 10, the first lever 661 for forward rotation includes the first contact section 661*c* in contact with an engagement pin 82 as a first pressing section when the piston 61 moves forward, and the second contact section 661*d* in contact with an engagement pin 82 when the piston 61 moves backward. Similarly, the second lever 662 for forward rotation includes the first contact section 662*c* in contact with an engagement pin 83 as a second pressing section when the piston 61 moves forward and the second contact section 662*d* in contact with an engagement pin 83 when the piston 61 moves backward.

Therefore, as similar to the lever 66 of the actuator 54 for forward rotation, the piston 61 of the first actuator 541 for forward rotation is provided with a first swing regulating section 61*c* configured to regulate swing of the first lever 661 for forward rotation when the first contact section 661*c* is brought in contact with the engagement pin 82 as the first pressing section by the forward movement of the piston 61. Similarly, the piston 61 of the actuator 542 for forward rotation is provided with a second swing regulating section 61*c* configured to regulate swing of the second lever 662 for forward rotation when the first contact section 662*c* is brought in contact with the engagement pin 83 as the second pressing section by the forward movement of the piston 61.
Actuators for Backward Rotation The piston 61 as the first reciprocating member configuring the first actuator 551 for backward rotation is provided with a first lever 671 for backward rotation, and the piston 61 as the second reciprocating member configuring the second actuator 552 for backward rotation is provided with a second lever 672 for backward rotation. The levers 671 and 672 are similar to the lever 67 for backward rotation in the actuator 55 for backward rotation, and include base sections 671*a*, 672*a*, lever pieces 671*b*, 672*b*, first contact sections 671*c*, 672*c*, and second contact sections 671*d*, 672*d* corresponding to the base section 67*a*, the lever piece 67*b*, the first contact section 67*c*, and the second contact section 67*d*, respectively. A stroke Q of the reciprocation of the piston 61 in each of the actuators 551 and 552 is half the stroke R of the actuator 55 for backward rotation.

As illustrated in FIG. 10, the first lever 671 for backward rotation includes the first contact section 671*c* in contact with an engagement pin 82 as a first pressing section when the piston 61 moves forward, and the second contact section 671*d* in contact with an engagement pin 82 when the piston 61 moves backward. Similarly, the second lever 672 for backward rotation includes the first contact section 672*c* in contact with an engagement pin 83 as a second pressing section when the piston 61 moves forward and the second contact section 672*d* in contact with an engagement pin 83 when the piston 61 moves backward.

Figure 11:
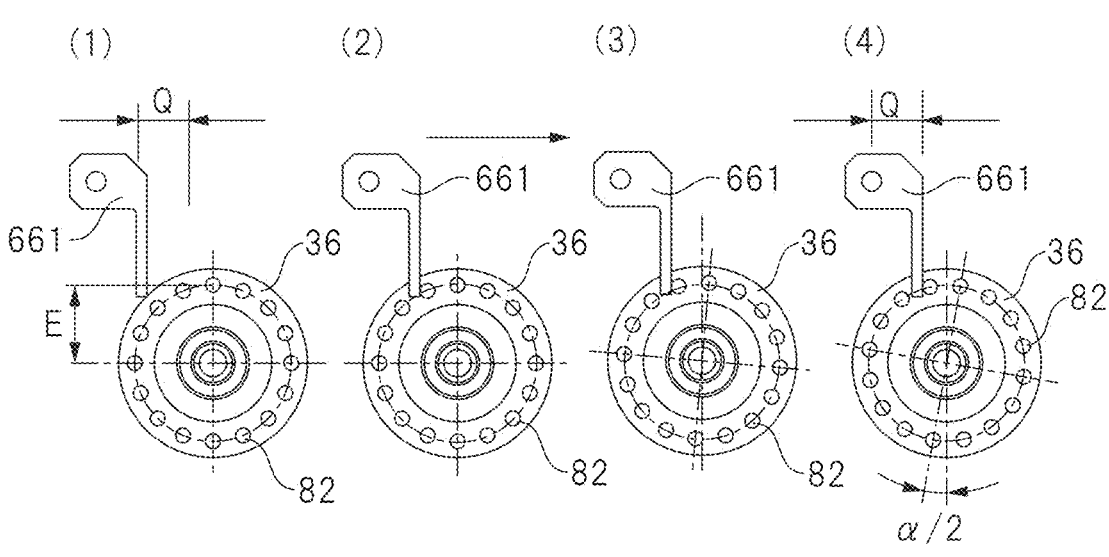
FIG. 11 is a step flowchart illustrating a moving state of a first lever for forward rotation for use in regulating the valve body at a constant opening degree.
Figure 11:
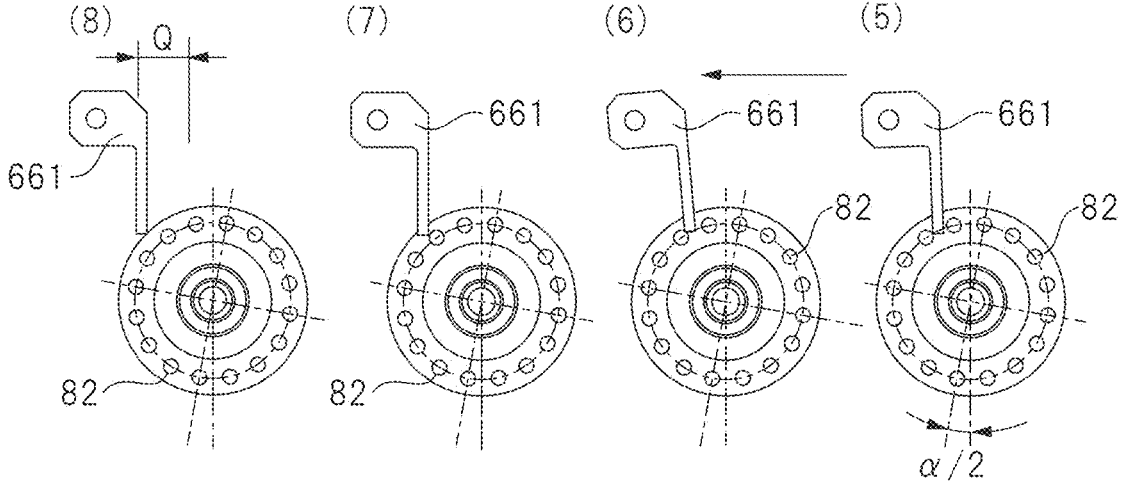
Figure 12:
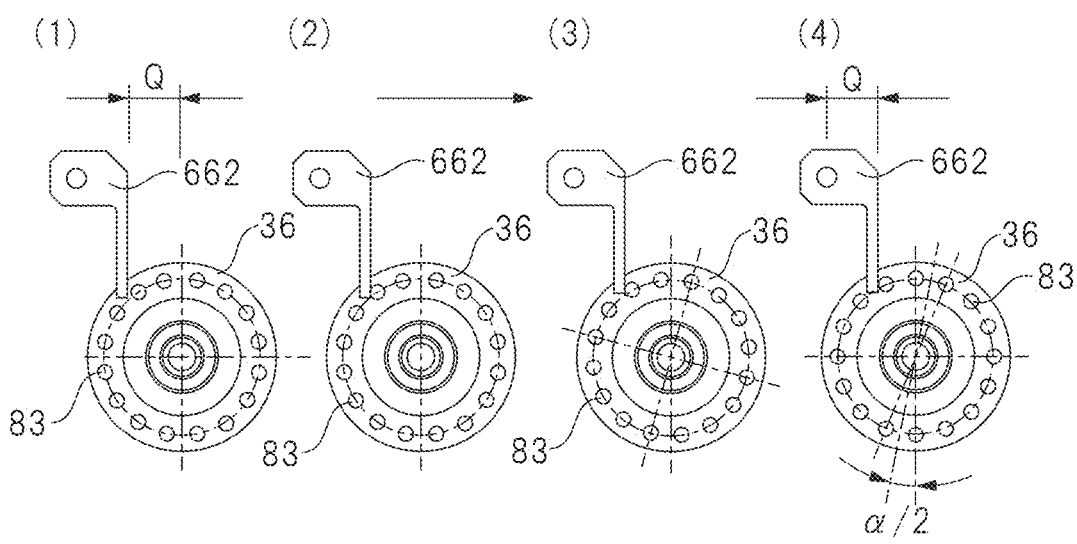
FIG. 12 is a step flowchart illustrating a moving state of a second lever for forward rotation for use in regulating the valve body at a constant opening degree.
Figure 12:
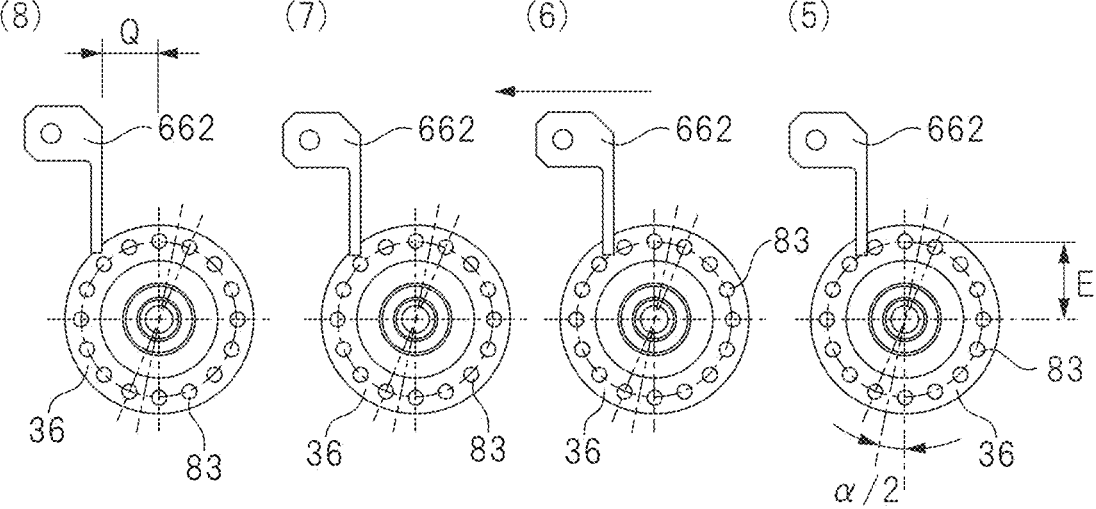

Therefore, as similar to the lever 67 of the actuator 55 for backward rotation, the piston 61 of the first actuator 551 for backward rotation is provided with a first swing regulating section 61*c* configured to regulate swing of the first lever 671 for backward rotation when the first contact section 671*c* is brought in contact with the engagement pin 82 as the first pressing section by the forward movement of the piston 61. Further, the piston 61 of the actuator 552 for backward rotation is provided with a second swing regulating section 61*c* configured to regulate swing of the second lever 672 for backward rotation when the first contact section 672*c* is brought in contact with the engagement pin 83 as the second pressing section by the forward movement of the piston 61.
Steps of Forward Rotation of Rotator FIG. 11 is a step flowchart illustrating a moving state of the first lever 661 for forward rotation for use in regulating the valve body 28 at a constant opening degree, and FIG. 12 is a step flowchart illustrating a moving state of the second lever 662 for forward rotation for use in regulating the valve body 28 at a constant opening degree. By alternate reciprocation of the first actuator 541 and the second actuator 542 for forward rotation, the rotator 36 is rotated to 11.25 $(\alpha/2)°$ at each time.

In FIG. 11, step (1) indicates a position of the lever 661 corresponding to the backward-moving limit position of the piston 61 of the first actuator 541 for forward rotation, and step (4) indicates a position of the lever 661 corresponding to the forward-moving limit position of the piston 61. The piston 61 reciprocates at the stroke Q, the stroke Q is half the stroke R of the flow-rate control valve 10*a*, and the rotator 36 is rotated to a pitch of $(\alpha/2)°$ by the first actuator 541 through step (1) to step (4). In this state, when the piston 61 of the first actuator 541 is moved backward from the position in step (5) to the backward-moving limit position in step (8), the lever 661 swings and does not rotate the rotator 36.

In FIG. 12, step (1) indicates a position of the lever 662 corresponding to the backward-moving limit position of the piston 61 of the first actuator 542 for forward rotation, and step (4) indicates a position of the lever 662 corresponding to the forward-moving limit position of the piston 61. In a state in which the first actuator 541 for forward rotation is in the state of step (8) of FIG. 11, when the piston 61 of the second actuator 542 for forward rotation is moved forward with the stroke Q from the backward-moving limit position in step (1) in FIG. 12 to the forward-moving limit position in step (4), the rotator 36 is further rotated to another $(\alpha/2)°$. In this state, when the piston 61 of the second actuator 542 is moved backward from the position in step (5) to the backward-moving limit position in step (8), the lever 662 swings and does not rotate the rotator 36.

The radius E as the distance from the rotation center O of the rotator 36 to the center N of the engagement pin 82, 83 in the flow-rate control valve 10*b* is set the same as the radius E as the distance from the rotation center O of the rotator 36 to the center N of the engagement pin 52 in the flow-rate control valve 10*a*, and a pitch between the adjacent engagement pins 82, 83 in the rotation direction is set the same as the pitch between the adjacent engagement pins 52. Further, the engagement pin 82 as the first pressing section and the engagement pin 83 as the second pressing section shift from each other by ½ pitch in the rotation direction.

As a result, even if the numbers of the engagement pins 82 and 83 are equal to the number of the engagement pins 52, by alternate rotation of the first actuator 541 and the second actuator 542 for forward rotation to rotate the rotator 36 of the flow-rate control valve 10*b*, the opening degree of the valve body 28 can be regulated to be closed at half the pitch of the rotator 36 of the flow-rate control valve 10*a*, and the flow-rate control valve 10*b* can regulate the opening degree of the valve body 28 to be closed, with more accuracy than that in the flow-rate control valve 10*a*.
Steps of Backward Rotation of Rotator In order to move the valve body 28 away from the valve seat 29 to widen the opening degree of the communicating section 16, the first actuator 551 and the second actuator 552 for backward rotation are alternately driven to cause index backward rotation of the rotator 36 at every half the pitch α of the engagement pins 83 in the rotation direction.

In order to rotate the rotator 36 backward to an angle $(\alpha/2)$ by the first actuator 551, the pistons 61 and 68 as the first reciprocating members are moved forward by the stroke Q, and then, are moved backward to the original backward-moving limit positions as similar to the first actuator 541. Next, in order to rotate the rotator 36 backward to the same angle by the second actuator 552, the pistons 61 and 68 as the second reciprocating members are moved forward by the stroke Q.

In this manner, by the alternate index rotation of the first actuator 551 and the second actuator 552 for backward rotation, the opening degree of the valve body 28 can be regulated to be opened at half the pitch of the rotator 36 of the flow-rate control valve 10*a*, and the flow-rate control valve 10*b* can regulate the opening degree of the valve body 28 to be opened, more accurately than that in the flow-rate control valve 10*a*.

Still Another Embodiment

Figure 13:
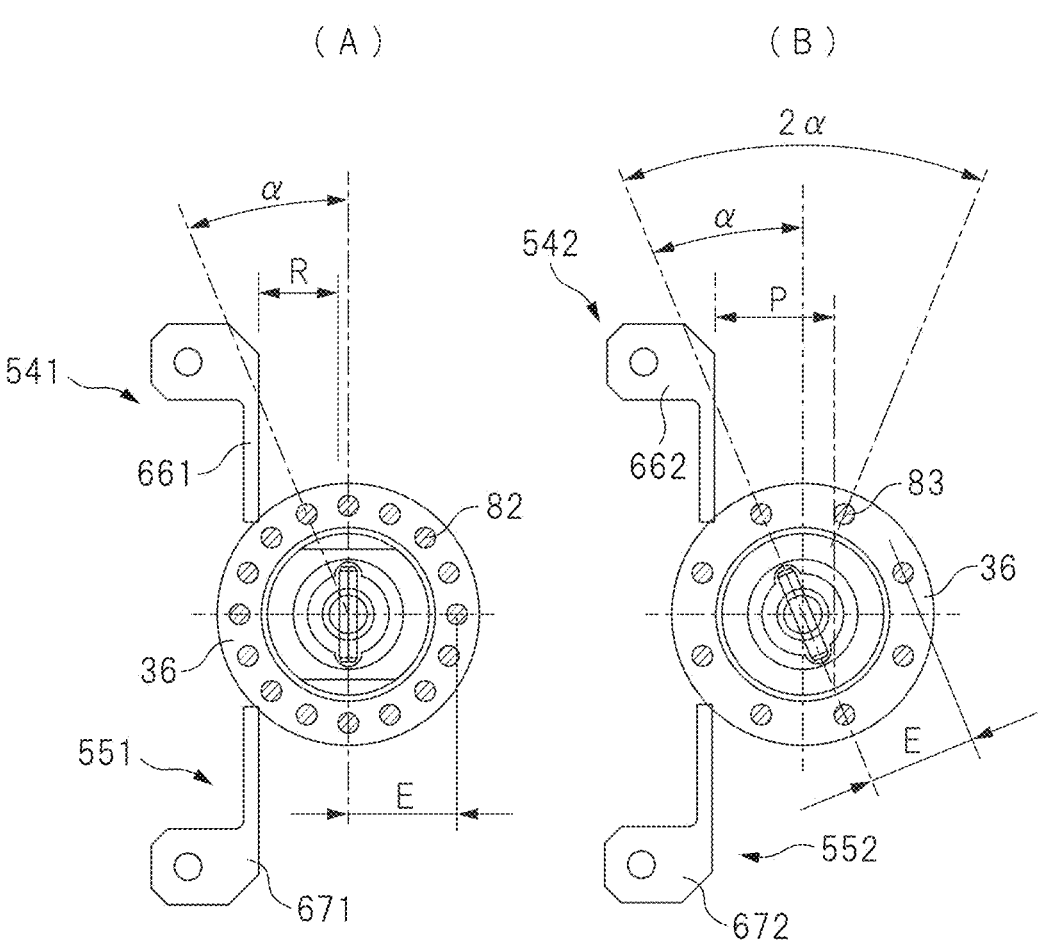
FIG. 13 is a cross-sectional view illustrating a rotator in a flow-rate control valve according to still another embodiment.

FIG. 13 is a cross-sectional view illustrating the rotator 36 of a flow-rate control valve 10*c* according to still another embodiment, FIG. 13A illustrates similar components as in FIG. 10A, and FIG. 13B illustrates similar components as in FIG. 10B.

As similar to the flow-rate control valve 10*b* of FIG. 8, the flow-rate control valve 10*c* includes the first actuator 541 and the second actuator 542 for forward rotation, and the first actuator 551 and the second actuator 552 for backward rotation.

The stroke R of the reciprocation of the pistons 61 and 68 and the radius E of the engagement pin 82 in the first actuator 541 for forward rotation are the same as the stroke R of the reciprocation of the piston 61 and the radius E of the engagement pin 52 in the flow-rate control valve 10*a*, and the rotator 36 is provided with the engagement pins 82 with a pitch of the angle α in the rotation direction.

To the contrary, the rotator 36 in the second actuator 542 for forward rotation is provided with eight engagement pins 83 at every constant angle with a pitch of the angle 2α, that is, with twice the pitch of the first actuator 541 in the rotation direction. A stroke P of the reciprocation of the pistons 61 and 68 in the second actuator 542 is set larger than the stroke R of the reciprocation of the piston 61 in the first actuator 541.

The structure of the first actuator 551 for backward rotation is the same as that of the first actuator 541 for forward rotation, and the structure of the second actuator 552 for backward rotation is the same as that of the second actuator 542 for forward rotation.

As described above, since the drive mechanism 53 is provided with the first actuators 541, 551 and the second actuators 542, 552 while the engagement pins 82 and the engagement pins 83 provided on the rotator 36 are different from each other in the pitch in the rotation direction, the rotator 36 can be rotated and driven to a larger angle by the engagement pins 83 with the larger pitch, and the valve body 28 can be rapidly regulated and moved. To the contrary, the rotator 36 can be rotated and driven by the engagement pins 82 with the smaller pitch to finely regulate the opening degree of the valve body 28.

Modification Example

The present invention is not limited to the embodiments, and may be variously modified within the scope of the present invention without deviating from the concept. For example, each of the flow-rate control valves 10*a* to 10*c* includes two actuators that are the actuators for forward rotation and backward rotation. However, either one of the actuators may drive only either case in which the valve body 28 increases or decreases the opening degree of the flow channel. Additionally, the opening degree may be regulated by manually rotating the rotator 36.

The rotator 36 is provided with the engagement pins 52, 82, 83 as engaging sections. However, the rotator 36 may be provided with a gear with teeth as many as the engagement pins 52, 82, 83. In this case, a space is formed between adjacent teeth such that the rotator 36 can be rotated through each lever as illustrated in FIG. 7 by the forward or backward movement of the first piston 61.

The valve body 28 is a diaphragm valve, but may be a needle valve, a poppet valve, or the like. Additionally, by addition of a valve assembly moving mechanism configured to move the valve assembly 60 to a position where the valve assembly 60 abuts on the adjusting screw member 50 and a position where the valve assembly 60 is away from the adjusting screw member 50, the present invention can be applied to an opening/closing valve in which the valve body 28 reciprocates between a fully closed position where the valve body 28 is in contact with the valve seat and a fully opened position where the valve body 28 is away from the valve seat. In this case, the fully opened position of the valve body 28 can be accurately regulated by the actuators.

Each of the flow-rate control valves is applied to control the speed of the actuator driven by the fluid such as the compressed air, to control the flow rate of the fluid discharged from a nozzle and others.

While the present disclosure has been illustrated and described with respect to a particular embodiment thereof, it should be appreciated by those of ordinary skill in the art that various modifications to this disclosure may be made without departing from the spirit and scope of the present disclosure.

The invention claimed is:

1. A flow-rate control valve comprising:
   a flow channel block including a flow channel configured to guide a fluid, formed therein;
   a housing provided in the flow channel block and provided with a valve assembly to be reciprocable, the valve assembly including a valve body configured to regulate an opening degree of the flow channel;
   a driving force transmission mechanism provided in the housing and including an adjusting screw member rotatably provided and configured to adjust a position of the valve body by rotation, a rotator configured to rotate the adjusting screw member, and a pressing section provided on the rotator;
   a drive mechanism including an actuator with a reciprocating member embedded therein and provided in the driving force transmission mechanism;
   a lever swingably mounted on the reciprocating member and provided with a first contact section in contact with the pressing section when the reciprocating member moves forward and a second contact section in contact with the pressing section when the reciprocating member moves backward; and
   a swing regulating section provided in the reciprocating member and configured to regulate swing of the lever at least when the first contact section is in contact with the pressing section,
   wherein the rotator is rotated to a constant angle by reciprocation of the reciprocating member to regulate the opening degree of the flow channel by using the valve body.

2. The flow-rate control valve according to claim 1,
   wherein the driving force transmission mechanism includes a braking member configured to apply rotational resistance to the rotator.

3. The flow-rate control valve according to claim 1, comprising:
   a return mechanism configured to apply, to the lever, return force for pressing the lever against the swing regulating section.

4. The flow-rate control valve according to claim 2, comprising:

a return mechanism configured to apply, to the lever, return force for pressing the lever against the swing regulating section, wherein the return force is smaller than the rotational resistance, and the lever is swingable when the second contact section is in contact with the pressing section.

5. The flow-rate control valve according to claim 3, wherein the return mechanism is made of a return pin and a spring.

6. The flow-rate control valve according to claim 3, wherein the flow-rate control valve includes:

a press state in which the lever is in contact with the pressing section at the first contact section;

a swing state in which the lever is in contact with the pressing section at the second contact section; and a non-contact section in which the lever is not in contact with the pressing section, wherein the second contact section is made in contact with the swing regulating section by the return mechanism in the press state and in the non-contact state.

7. The flow-rate control valve according to claim 1, wherein the reciprocating member includes a first piston mounted with the lever and a second piston abutting on the first piston, and the actuator includes a first cylinder provided with the first piston being reciprocable in an axial direction and a second cylinder provided with the second piston being reciprocable in the axial direction.

8. The flow-rate control valve according to claim 7, wherein the reciprocating member is moved forward by fluid pressure applied to the first piston, and is moved backward by spring force applied to the second piston.

9. The flow-rate control valve according to claim 1 wherein the drive mechanism includes:

an actuator for forward rotation including a reciprocating member for forward rotation;

a lever for forward rotation mounted on the reciprocating member for forward rotation;

an actuator for backward rotation including a reciprocating member for backward rotation; and a lever for backward rotation mounted on the reciprocating member for backward rotation, the actuator for forward rotation rotates the rotator forward to a constant angle by using the lever for forward rotation by reciprocation of the reciprocating member for forward rotation, and the actuator for backward rotation rotates the rotator backward to a constant angle by using the lever for backward rotation by reciprocation of the reciprocating member for backward rotation.

10. The flow-rate control valve according to claim 1, wherein the adjusting screw member includes a hollow screw shaft and a valve driving shaft, and the hollow screw shaft is a differential screw including a female screw screwed to the valve driving shaft and a male screw screwed to the housing such that the female screw and the male screw are different from each other in pitch.

11. The flow-rate control valve according to claim 1, wherein the pressing section is an engagement pin provided at a position with the same radius and separating by the same angle from a center of rotation of the rotator, and having a circular cross section.

12. The flow-rate control valve according to claim 1, wherein the valve assembly includes an abutting member abutting on the adjusting screw section, and the adjusting screw section adjusts a position of the valve assembly when being in contact with the abutting member.

13. The flow-rate control valve according to claim 12, comprising:

a valve assembly moving mechanism configured to move the valve assembly to a position where the valve assembly abuts on the adjusting screw member and a position where the valve assembly is away from the adjusting screw member.

14. The flow-rate control valve according to claim 1, wherein the rotator includes a first pressing section and a second pressing section, the drive mechanism includes a first actuator with a first reciprocating member embedded therein and a second actuator with a second reciprocating member embedded therein, a first lever is swingably mounted on the first reciprocating member, the first lever being provided with a first contact section being in contact with the first pressing section when the first reciprocating member moves forward and a second contact section being in contact with the first pressing section when the first reciprocating member moves backward, a second lever is swingably mounted on the second reciprocating member, the second lever being provided with a second contact section being in contact with the second pressing section when the second reciprocating member moves forward and a second contact section being in contact with the second pressing section when the second reciprocating member moves backward, the first reciprocating member is provided with a first swing regulating section configured to regulate swing of the first lever when the first contact section of the first lever is in contact with the first pressing section, the second reciprocating member is provided with a second swing regulating section configured to regulate swing of the second lever when the first contact section of the second lever is in contact with the second pressing section, and the rotator is rotated by the first reciprocating member and the second reciprocating member.

15. The flow-rate control valve according to claim 14, wherein the first pressing section and the second pressing section are provided on the rotator at every constant rotation angle with the same pitch, and the first pressing section and the second pressing section shift from each other by ½ pitch in a rotation direction, and the rotator is rotated to ½ pitch by every alternate rotation of the rotator by the first reciprocating member and rotation of the rotator by the second reciprocating member.

16. The flow-rate control valve according to claim 14, wherein the drive mechanism includes:

a first actuator for forward rotation including a first reciprocating member for forward rotation;

a second actuator for forward rotation including a second reciprocating member for forward rotation;

a first actuator for backward rotation including a first reciprocating member for backward rotation; and a second actuator for backward rotation including a second reciprocating member for backward rotation, a first lever for forward rotation is mounted on the first reciprocating member for forward rotation, a second lever for forward rotation is mounted on the second reciprocating member for forward rotation, a first lever for backward rotation is mounted on the first reciprocating member for backward rotation, a second lever for backward rotation is mounted on the second reciprocating member for backward rotation, the rotator is rotated forward to a constant angle by the first lever and the second lever for forward rotation by alternate reciprocation of the first reciprocating member and the second reciprocating member for forward rotation, and the rotator is rotated backward to a constant angle by the first lever and the second lever for backward rotation by alternate reciprocation of the first reciprocating member and the second reciprocating member for backward rotation.

17. The flow-rate control valve according to claim 14, wherein the first pressing section and the second pressing section are provided on the rotator so as to have different pitches from each other.

18. The flow-rate control valve according to claim 17, wherein a pitch of one of the first pressing section and the second pressing section in a rotation direction is twice a pitch of the other of the first pressing section and the second pressing section in the rotation direction.

* * * * *